No. 839,054. PATENTED DEC. 18, 1906.
F. WOODRUFF.
METHOD OF MAKING LIGHT EDGED PRESSED GLASSWARE.
APPLICATION FILED FEB. 28, 1906.
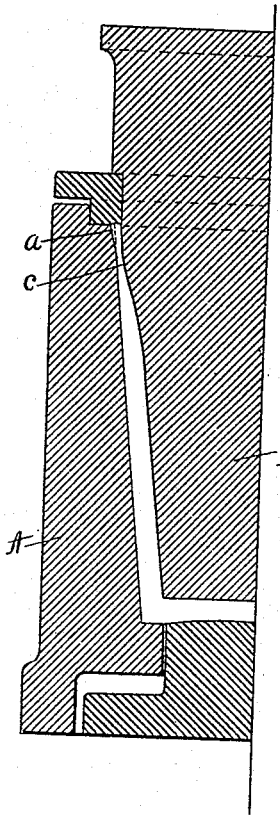
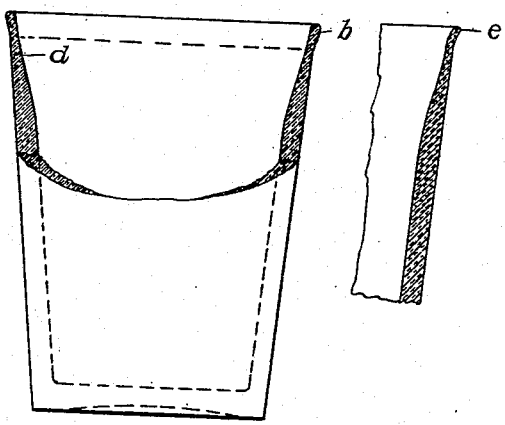
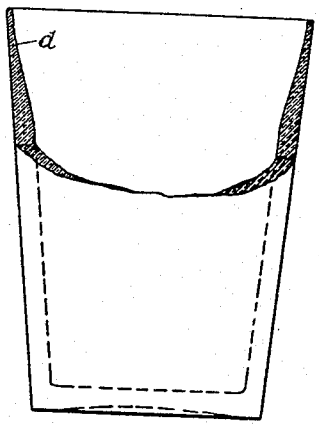
WITNESSES:
D. C. Walter
Mary J. Shay
INVENTOR,
Frank Woodruff,
By Owen & Owen
His attorneys.

UNITED STATES PATENT OFFICE.

FRANK WOODRUFF, OF TOLEDO, OHIO.

METHOD OF MAKING LIGHT-EDGED PRESSED GLASSWARE.

No. 839,054.　　　　　Specification of Letters Patent.　　　　　Patented Dec. 18, 1906.

Application filed February 28, 1906. Serial No. 303,326.

*To all whom it may concern:*

Be it known that I, FRANK WOODRUFF, a citizen of the United States, and a resident of Toledo, in the county of Lucas and State of Ohio, have invented a certain new and useful Method of Making Light-Edged Pressed Glassware; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the manufacture of pressed glassware, and particularly to the class of pressed glassware intended to be cut and on which it is desired to form a thin edge—such, for instance, as goblets, tumblers, and similar articles of tableware.

In pressing a tumbler-blank for cutting purposes the plastic glass is dropped into a mold made of iron of the required interior shape and configuration and formed into shape by pressure. After the glass is pressed into the required shape it is attached to a long piece of iron, called a "punty," and placed in a glory-hole or reheating-furnace.
This heating melts off all mold marks, removes the oxid of iron from the surface of the glass article, and also melts the outer skin of the glass, giving it a brilliant effect. This method of forming tumbler-blanks or the like for cutting purposes is perfectly satisfactory in the case of heavy-edged articles of glassware, but has been found to be impractical in the manufacture of light-edged articles of glassware, thus necessitating the manufacturing of such light-edged ware by hand, which is the more expensive process.

In the pressing of a light-edged article of glass it is almost impossible for the presser, unless he possess a high degree of skill, to hold the plunger in the mold the proper length of time to cause it to set perfectly therein and at the same time avoid a cracking or crazing of the light edge thereof, which cracking or crazing makes it a non-salable article.

The object of my invention is to provide a new and improved method of manufacturing pressed articles of glassware having light edges whereby to prevent the cracking or crazing of such light edges due to the continued pressure of the forming-plunger therein until the glass is perfectly set, and also to prevent a melting of the light edge during the reheating or fire-polishing process, and to cheapen the present cost of manufacture thereof.

The invention is illustrated in the accompanying drawings, in which—

Figure 1 is an elevation, partly in vertical section, of a tumbler-blank having its edge formed with a slight annular protuberance or enlargement as it appears when removed from the mold. Fig. 2 is a similar view of a tumbler in finished state with the protuberance or heavy edge ground off. Fig. 3 is a section of a portion of a tumbler having the bulge formed on its edge by a slight flaring thereof, and Fig. 4 is a vertical section of a portion of a mold designed to form the tumbler shown in Fig. 1.

In the carrying out of my process to produce a tumbler having a light edge, as shown in Fig. 2, I employ a mold precisely the same in shape as one employed to form a heavy-edged tumbler, except that the interior of the female mold member A is formed with an annular recess, as shown at *a* in Fig. 4, which recess is disposed and shaped to form a gradual or upwardly and outwardly tapered bead or projection circumferentially on the upper edge of the tumbler, as shown at *b* in Fig. 1. The plunger or male member B coöperating with the mold may either be formed adjacent its upper edge with a slight annular bulge *c* to press the interior rim of the tumbler into the shape shown at *d* in Figs. 1 and 2, or it may be shaped to have a taper somewhat more decided than the interior taper of the mold, to effect in either instance a diminished thickness of the sides of the tumbler at the rim thereof, whereby to form a light or frail edge, as shown in Fig. 2, when the bead or projection *b* is removed to form the finished article.

To form a tumbler having a light edge by the old method would produce an article substantially like the one shown in Fig. 2. When a glass-blank like this is introduced into the glory-hole or reheating-furnace and allowed to remain long enough to reheat or polish it, the light edge is melted, so that it is heavy and clumsy. When the same thing is done with a glass-blank like the one shown in Fig. 1, the effect is altogether different, for the reason that the edge is a great deal heavier, and therefore resists the heat until the blank is thoroughly fire-polished. The blank after being fire-polished and annealed or passed through the lehrs is taken to a grinding-machine and the bead or projection $b$ ground off, so that the outer sides of the tumbler are perfectly straight, thus producing a blank with a neat light edge which looks exactly like a hand-made tumbler.

By the employment of my process it is apparent that a considerable amount of the skill required in the performance of the old process to press the blanks of light-edged glassware is eliminated, as the edge being heavier enables the presser to hold down on the article until it is set so it will retain the exact form of the mold when removed after the pressing operation without danger of cracking or crazing its edge. It also enables the article to be thoroughly fire-finished or fire-polished, which is very important to the production of a perfect article, as the blanks should be fire-polished on the inside and outside, so as to absolutely remove all oxid of iron which adheres to the glass from the plunger on the inside and from the mold on the outside.

In Fig. 3 the edge of the tumbler is shown as being flared, as at $e$, to form the annular bulge or projection thereon. This flare may either be formed thereon during the pressing operation or by hand after the glass-blank comes from the mold. After this blank has been subjected to the fire-polishing and annealing process the flared or projecting portion of the edge is ground down substantially to the dotted line shown in said figure, or sufficiently to form a straight outer surface on the article.

It is obvious that my process applies to any and all blanks for light-edged glassware that are intended to be cut and that the figures intended to be cut on the same may be cut in the mold whereby to partly finish the pressed blank, or the blank may be pressed plain and the desired figures cut on it afterward, and also that the protuberance or bulge may either be pressed or formed thereon by hand.

Having thus described my invention, what I claim as new, and desire to secure by Letters Patent, is—

1. A method of manufacturing light-edge pressed glassware, consisting of forming the light edge of the glass-blank with an annular bead or projection, and grinding off the bead or projection after the fire-polishing and annealing operations.

2. A method of manufacturing light-edged pressed glassware, consisting of forming the light edge of the glass-blank with an annular protuberance or bulge and permitting it to remain on the blank during the fire-polishing and annealing processes and then grinding it off to form a thin edge.

3. A method of manufacturing light-edged pressed glassware, consisting of forming a bulge or protuberance on the light edge of the glass-blank simultaneous with the pressing of the blank and permitting it to remain on the blank during the fire-finishing process then grinding it off to form a light uniform edge, the said bulge or protuberance being heaviest at its rim edge.

4. A method of manufacturing light-edged pressed glassware consisting of forming an annular projection on the light edge of the glass-blank at the time it is pressed, which prevents a cracking or crazing of the edge of the article during the pressing operation and removing such projection after the fire-finishing and annealing operations whereby to form the light edge.

5. A method of manufacturing light-edged pressed glassware to be cut consisting of providing the female mold member with an annular recess positioned to form a bulge or enlargement at the rim of the article-blank, forming a glass-blank therein then reheating the blank to thoroughly fire-polish it, then annealing it, and finally grinding the bulge or enlargement from the rim of the blank, substantially as described.

In witness whereof I have hereunto signed my name to this specification in the presence of two subscribing witnesses.

FRANK WOODRUFF.

Witnesses:
C. W. OWEN,
CECILIA M. FRANK.